United States Patent
Shimamoto

(10) Patent No.: US 8,355,406 B1
(45) Date of Patent: Jan. 15, 2013

(54) SETTING SIGNAL-POWER THRESHOLDS ON NODES IN A COMMUNICATIONS NETWORK

(75) Inventor: Andrew Y. Shimamoto, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 307 days.

(21) Appl. No.: 12/483,534

(22) Filed: Jun. 12, 2009

(51) Int. Cl.
 *H04L 12/28* (2006.01)
(52) U.S. Cl. .......................... 370/400; 398/38
(58) Field of Classification Search .................. 370/400; 398/38
See application file for complete search history.

(56) References Cited

U.S. PATENT DOCUMENTS

| | | | |
|---|---|---|---|
| 4,797,948 A * | 1/1989 | Milliorn et al. | 340/10.52 |
| 7,099,934 B1 * | 8/2006 | Ewing et al. | 709/223 |
| 7,330,652 B1 * | 2/2008 | Maxham | 398/37 |
| 2005/0125195 A1 * | 6/2005 | Brendel | 702/182 |
| 2007/0008927 A1 * | 1/2007 | Herz et al. | 370/331 |
| 2008/0123870 A1 * | 5/2008 | Stark et al. | 381/86 |

* cited by examiner

*Primary Examiner* — Robert Wilson
*Assistant Examiner* — Wei Zhao

(57) ABSTRACT

Systems and media for setting signal-power-received threshold values on nodes of a communications network. A segment on a route of a communications network transmission route is identified. A number of spans in the segment and a number of channels transmitted over a segment is determined. Based on design specifications, a signal-power-received threshold value is calculated. The signal-power-received threshold value may be adjusted to accommodate for segment performance. The signal-power-received threshold value is communicated to and set on one or more nodes on the segment.

17 Claims, 7 Drawing Sheets

SETTING SIGNAL-POWER THRESHOLDS ON NODES IN A COMMUNICATIONS NETWORK

SUMMARY

Embodiments of the invention are defined by the claims below, not this Summary. A high-level overview of various aspects of the invention are provided here for that reason, to provide an overview of the disclosure, and to introduce a selection of concepts that are further described below in the Detailed Description section. This Summary is not intended to identify key features or essential features of the claimed subject matter, nor is it intended to be used as an aid in isolation to determine the scope of the claimed subject matter.

Embodiments of the invention provide methods, systems, and media for setting signal-power-received thresholds on nodes in a communications network, such as a fiber-optic communications network. The signal-power-received thresholds indicate a range of power levels within which a signal transmission along a segment of the communications network should be received. Receipt of a signal transmission having a power level outside of the indicated range may be indicative of a malfunction, damage, or other issue in the communications network.

Data, such as a number of spans crossed by a transmission and a number of channels included in the transmission are determined. The data is utilized along with design specification data for components of the communications network to determine signal-power-received threshold values for signal transmissions over segments or routes of the communications network. The calculated thresholds are communicated to and set on nodes of the segments or routes of the communications network.

BRIEF DESCRIPTION OF THE DRAWINGS

Illustrative embodiments of the invention are described in detail below with reference to the attached drawing figures, and wherein.

DETAILED DESCRIPTION

Figure 1:
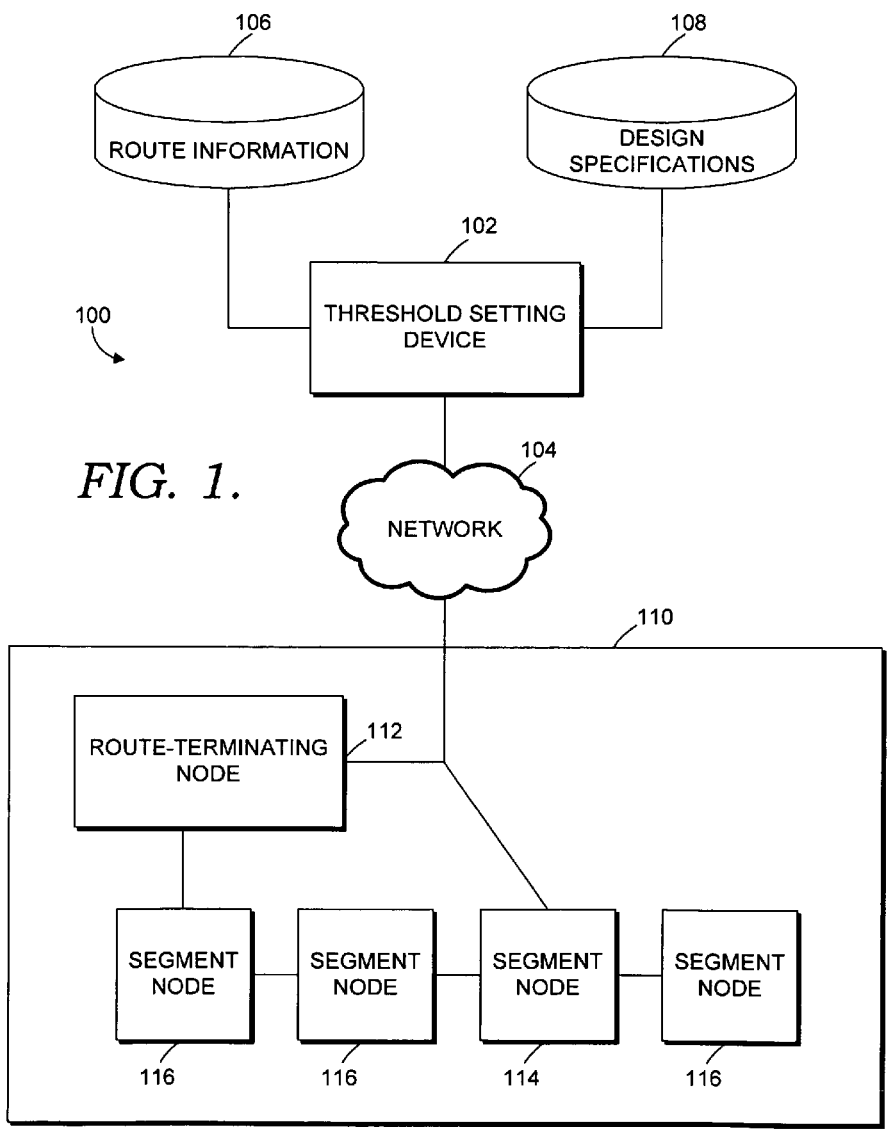
FIG. 1 is a block diagram of an exemplary operating environment suitable for use in embodiments of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention. The following is a list of these acronyms:

| | |
|---|---|
| DWDM | Dense Wavelength Division Multiplexing |
| ILA | Intermediate Line Amplifier |
| IP | Internet Protocol |
| OADM | Optical Add/Drop Multiplexer |
| OLA | Optical Line Amplifier |
| PDA | Personal Data Assistant |
| WADM | Wavelength Add/Drop Multiplexer |
| WDM | Wavelength Division Multiplexing |

Further, various technical terms are used throughout this description. An illustrative resource that fleshes out various aspects of these terms can be found in Newton's Telecom Dictionary by H. Newton, 24th Edition (2008).

Embodiments of the invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media; random-access memory (RAM); read-only memory (ROM); electrically erasable programmable read-only memory (EEPROM); flash memory or other memory technology; compact disc read-only memory (CD-ROM); digital versatile discs (DVD); holographic media or other optical disc storage; magnetic cassettes; magnetic tape; magnetic disk storage; and other magnetic storage devices. These technologies can store data momentarily, temporarily, or permanently.

Embodiments of the invention describe media and systems for setting received power threshold values on nodes in a communications network. In a first embodiment, computer-readable media having computer-executable instructions embodied thereon that, when executed, perform a method in a communications network for setting received signal power threshold values on nodes in the communications network are described. A computing device calculates a signal-power-received threshold for a segment of a communications network based on design specifications for the communications network. The signal-power-received threshold for said segment is adjusted. The computing device sets the signal-power-received threshold for the segment on nodes in the segment.

In another embodiment, a system in a communications network for setting signal-power-received thresholds is described. The system includes a node-identifying component, a threshold-calculating engine, and a threshold-setting component. The node-identifying component identifies nodes on a route in a communications network that comprise a segment of the route, and identifies a number of spans between the nodes and a number of channels transmitted over the segment. The segment includes two terminating nodes that comprise endpoints of the segment and all nodes therebetween. A span is a connection between two consecutive nodes of the segment. The threshold-calculation engine calculates a signal-power-received threshold for the segment based on the number of spans, the number of channels, and design specifications for the segment. The threshold-setting tool sets the signal-power-received threshold on the nodes in the segment.

In another embodiment, computer-readable media having computer-executable instructions embodied thereon that, when executed, perform a method to set received signal power threshold values in a fiber-optic communications network are described. A number of spans between terminating nodes of a segment of a fiber-optic communications network is determined. A terminating node is a node at an endpoint of the segment and a span is connection between two consecutive nodes of the segment. A number of channels being transmitted over the segment is determined. Based on the number of spans, the number of channels, and design specifications of the fiber-optic communications network, a signal transmission power level setpoint is identified. Based on the number of spans and the design specifications of the fiber-optic communications network, a maximum and a minimum allowable signal power loss for the segment is identified. Via a computing device, a maximum and a minimum signal-power-received threshold for the segment is calculated. The maximum and minimum signal-power-received thresholds for the segment are adjusted. The maximum and minimum signal-power-received thresholds for the segment are set via the computing device on nodes in the segment.

Embodiments of the invention are described herein with respect to a fiber-optic telecommunications network. However, any communications-network system may be employed in embodiments of the invention, such as telephone networks, cable television networks, wireless communications networks, or any other communications network known in the art. Such networks may employ fiber-optic communications systems, wired, or cable communications systems and devices.

A fiber-optics communications network includes a plurality of communication routes over which communication signals are transmitted from an initiation point to a receiving point. Such routes include various components for transmitting, receiving, routing, amplifying, attenuating, and filtering a signal being communicated over the network. These components include for example, and not limitation, a multiplexer, an amplifier, a wavelength add/drop multiplexer (WADM), an optic add/drop multiplexer (OADM), intermediate line amplifier (ILA), an optical line amplifier (OLA), and a demultiplexer among various other components and systems employed in a fiber-optic telecommunications network. Components or groups of components along a route are described as nodes along the route. In embodiments, a single node on a route in a communications network includes more than one component and thus, provides more than one function for communication of a signal along the route. For example, and not limitation, a single node may include multiple amplifiers as well as one or more filters and a multiplexer.

The fiber-optic lines used to connect the various components of the communications network and to carry the signals between the various components use any materials or technologies available in the art now, or in the future. Such materials include plastic, glass, or a combination thereof. The fiber-optic lines can be armored or nonarmored and designed for multi-mode, single-mode, or mono-mode transmission of signals among others. Each fiber carries one or more channels. A channel is descriptive of a signal transmission using a specific wavelength of light. Thus, multiple signals may be transmitted over a single fiber using multiple channels or multiple wavelengths of light. In an embodiment, wavelength division multiplexing (WDM) or dense wavelength division multiplexing (DWDM) is utilized to transmit eighty or more channels over a single fiber-optic line.

The signals are transmitted over the fiber-optic network using any available wavelength of light. Wavelengths of light in the infrared spectrum, such as light having wavelengths of between 750 nanometers and 100 micrometers are used in transmission of signals across a fiber-optic network. In an embodiment, wavelengths of light in the infrared spectrum of a conventional band, or C-band, having wavelengths between 1530-1565 nm, or about 1550 nm are used.

Further, the power (measured in decibels (dB) or watts, among other units of power) provided to the light signal transmissions is also controlled. The signals are transmitted at a predetermined power level such that the signals have sufficient power to be received at an opposite end of a fiber-optic line. A portion of the signal power is lost during transmission due to a variety of factors known in the art including for example, and not limitation, the number of fiber-optic lines used, material qualities of the fiber-optic lines, and conditions of the fiber-optic lines (such as the number of turns, splices, and length of the lines as well as any damage caused to the lines). Additionally, attenuators might be used to ensure that at least a predetermined amount of power is lost. As such, amplifiers are used to amplify a signal transmission to provide sufficient power levels thereof.

Additionally, signal-power-received thresholds indicate a range of optimal signal power settings based on design specifications and are set on nodes of a route to identify signal transmissions that are received having lost more or less power than expected. Such an instance might be indicative of a problem or malfunction within a communications route and could damage components along the route. An alarm is typically provided to an administrator in order to notify the administrator of the potential problem in the segment. In another embodiment, an alarm may trigger one or more other processes for determining a cause of a problem and/or for correcting a problem, such as for example a self-healing process. The alarm may be provided as an audible and/or visual alert, a log file entry, or another form of communication to an administrator or other application. For example, an alarm may include a buzzer on a control panel, an email alert to an administrator, or a status indication to another application, among others.

Referring now to the figures, and in particular FIG. 1, a block diagram of an exemplary operating environment 100 suitable for use in embodiments of the invention is described. The operating environment 100 includes a computing device 102 and a network 104. The computing device 102 is any computing device known in the art including for example and not limitation, a personal computer, a desktop computer, a laptop computer, a personal digital assistant (PDA), or a server computer, among various other computing devices known in the art. The computing device 102 includes one or more internal memory, external memory, processors, presentation components, input/output ports, input/outputs components, and a power supply, among various other components. Further, the computing device 102 is a component in a distributed computing environment or may be a stand-alone computing device.

The computing device 102 is in communication with a route-information database 106 and a design-specification database 108. The route-information database 106 is any database or computer memory known in the art and stores one or more data elements describing routes in a communications-network system and components therein. A route in a communications network is descriptive of the path a signal transmission takes from an initiating node to a receiving or terminating node and the components encountered therebetween. The data elements stored in the route-information database 106 include any desired information such as for example and not limitation, signal transmission routes, identification data for components along a route, Internet protocol (IP) addresses for components along a route, and system settings and system status indicators for components along a route.

The design-specification database 108 utilizes any database or computer memory technology known in the art. The design-specification database 108 stores data elements that indicate settings and expected performance characteristics of the various components of the communications network based on their design criteria. Such settings and characteristics may include, for example and not limitation, a power level for signal transmissions based on a number of spans and a number of channels being transmitted over a route, a maximum expected power loss in a transmission over a route, and a minimum power loss over a route. The data elements are based on a manufacturer's design and manufacturing specifications and requirements for components along a route. In an embodiment, the data elements are based on data gathered through use or experimentation with a component or system.

The network 104 includes any communications network known in the art, for example and not limitation, the Internet, an intranet, or any other private or public communications network. In an embodiment, the network 104 includes a telephone network, a teletype network, or a telecommunications network that uses communications protocols, such as TELNET. Through the network 104, the computing device 102 communicates with components on a communications network 110 such as a route-terminating node 112 or a segment node 114. A route-terminating node 112 is any component at a terminating end of a route on the communications network 110. A route-terminating node 112 includes a multiplexer, a de-multiplexer, or an amplifier, among other components.

A segment node 114 includes any node along a route as well as a route-terminating node 112. A segment node 114 may also include a multiplexer, a de-multiplexer, an amplifier, or a WADM, among other components. By connecting through the network 104 to a segment node 114, the computing device 102 also communicates with segment nodes 116. The segment nodes 116 are any nodes on a segment of a route and comprise any type of component described above with respect to the segment node 114.

Figure 2:
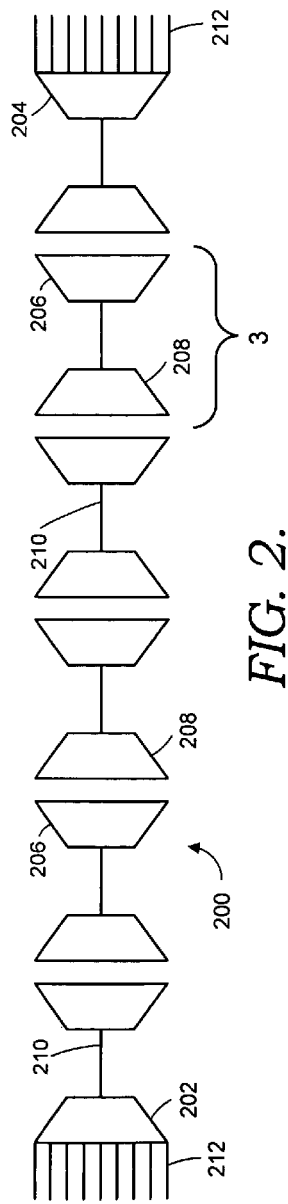
FIG. 2 is a block diagram depicting a route in a communications network in accordance with an embodiment of the invention.

With reference now to FIG. 2, a block diagram depicting a route 200 in a communications network in accordance with an embodiment of the invention is described. The route 200 is any fiber-optic communications route and includes a route-terminating node 202 and a route-terminating node 204. Route-terminating node 202 is a multiplexer or similar component at a first end of route 200. Route-terminating node 204 is the de-multiplexer or similar component at a second end of route 200. Route 200 further includes a plurality of segment-terminating nodes 206 and 208 and connections 210 therebetween. The segment-terminating node 206 is a de-multiplexer or similar component and segment-terminating node 208 is a multiplexer or similar component. The nodes 202-208 and the connections 210 function to transmit, carry, filter, amplify, and receive, among other functions, a plurality of channels 212 over the route 200. In an embodiment, signal transmissions occur in two directions along route 200 and thus, segment-terminating node 206 also acts as a multiplexer and segment-terminating node 208 also acts as a de-multiplexer. In such an embodiment, the number of channels 212 transmitted in each direction is equal as depicted in FIG. 2, but the number of channels 212 transmitted in each direction may be different. The connection 210 between segment-terminating nodes 208 and 206 includes fiber-optic line as well as various integral components. As depicted at 3, a portion of route 200 between a segment-terminating node 208 and a segment-terminating node 206 including the connection 210 therebetween comprises a segment 3 of the route 200.

The segment 3 includes any portion of a route 200 between consecutive segment-terminating nodes 208 and 206 and including a connection 210 therebetween. In another embodiment, a segment 3 may be defined as comprising any portion of route 200 as desired by a particular communications-network provider.

Figure 3:
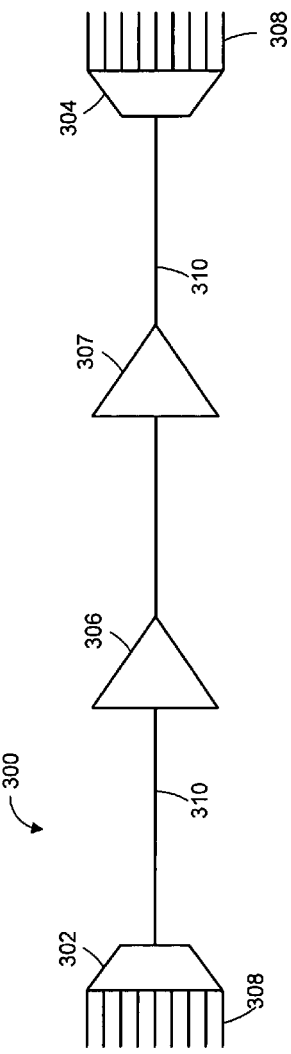
FIG. 3 is a block diagram depicting a segment of the route depicted at location 3 in FIG. 2 in accordance with an embodiment of the invention.

With reference now to FIG. 3, a block diagram depicting a segment 300 of a route, as depicted at location 3 in FIG. 2, is described in accordance with an embodiment of the invention. The segment 300 includes a segment-terminating node 302 at a first end of the segment 300 and a segment-terminating node 304 at a second end of the segment 300. The segment-terminating node 302 is a multiplexer and the segment-terminating node 308 is a de-multiplexer. In an embodiment, the segment-terminating node 302 and the segment-terminating node 304 also include amplifiers, filters, attenuators, or a WADM, among other components. In another embodiment, communications along segment 300 travel in two directions thus, the segment-terminating node 302 also functions as a de-multiplexer and the segment-terminating node 304 also functions as a multiplexer.

Between the segment-terminating nodes 302 and 304 are one or more segment nodes 306 connected by one or more connections or spans 310. The segment node 306 includes an amplifier, a WADM, an OADM, or any other component necessary for communication of signals along the segment 300. The connections between the segment nodes 306 and the segment-terminating nodes 302 and 304 include fiber-optic lines, as described above. Further, the segment-terminating nodes 302 and 304 and the segment nodes 306 may also include more than one component. Where more than one component is used at a node the components may be separate or integrated devices. Such components may include combinations of amplifiers, multiplexers, de-multiplexers, filters, attenuators, and WADMs, among others.

The segment 300 carries transmissions of a plurality of channels 308 from a first end of the segment 300 to a second end. In an embodiment, signals may be transmitted in two directions along the segment 300 and thus, travel from the segment-terminating node 302 to the segment-terminating node 304 and in the reverse direction. The segment-terminating node 302 is a multiplexer and functions to receive a plurality of channels 308 and process them for transmission along a span 310 comprising a fiber-optic line as is known in the art. The span 310 carries the transmission of the plurality of channels between the segment-terminating node 302 to the segment nodes 306 along segment 300 and to the segment-terminating node 304 (and in the reverse direction in bi-directional transmissions). The segment-terminating node 304 receives the transmission of the plurality of channels 308 along span 310. The segment-terminating node 304 filters the transmission to again separate each of the channels 308 from the transmission. By separating the channels 308, one or more of the channels 308 may be routed along a different route or otherwise processed for use or re-transmission, while one or more of the remaining channels may continue along a given route as depicted in FIG. 2.

Figure 4:
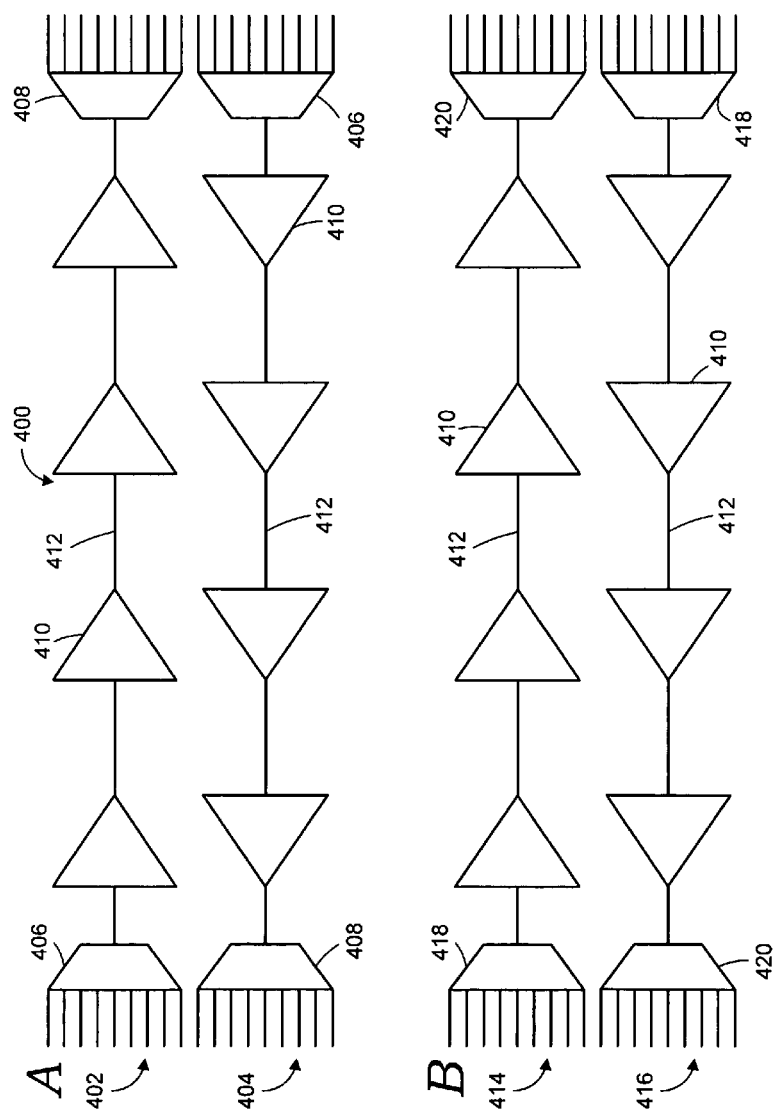
FIG. 4 is a block diagram depicting a primary and secondary segment of a route in a communications network, both the primary and secondary segments having bi-directional transmission paths in accordance with an embodiment of the invention.

With additional reference now to FIG. 4, a segment 400 of a route, such as route 200, is depicted as having a primary pathway A and a secondary pathway B. Both the primary pathway A and the secondary pathway B depict transmission of signals in two directions along the segment 400. The primary pathway A and the secondary pathway B are depicted in FIG. 4 as being identical but each of the pathways may be embodied in various ways known in the art.

The primary pathway A includes a segment-terminating node 406 and a segment-terminating node 408. The segment-terminating node 406 is a multiplexer and the segment-terminating node 408 is a de-multiplexer. A plurality of segment nodes 410 are included between the segment-terminating nodes 406 and 408 along the segment 400 and are connected by connections 412. The segment nodes 410, as described previously, include amplifiers, WADMs, OADMs, or other desirable components along the segment 400. The primary pathway A depicts transmission of signals in a first direction 402 and a second direction 404. Transmission of signals in the first direction 402 and the second direction 404 may be separated as depicted in FIG. 4 or the first direction 402 and the second direction 404 pathways may be combined such that segment-terminating nodes 406 and 408 act as both multiplexers and de-multiplexers. Accordingly, the segment nodes 410 and connections 412 would also provide transmission in both the first direction 402 and the second direction 404.

The secondary pathway B also includes a segment-terminating node 418 and a segment-terminating node 420 as well as segment nodes 410 and connections 412. The secondary pathway B utilizes communications in two directions as depicted in FIG. 4 along a first direction 414 and a second direction 416. The components of secondary pathway B 410, 412, 418, and 420 are any components as described above with the respect to primary pathway A.

Inclusion of the secondary pathway B provides failover protection for the primary pathway A. The failover protection provided by the secondary pathway B aids in ensuring continuity of service in the event that the primary pathway A is damaged or destroyed. As depicted in FIG. 4, the primary pathway A and the secondary pathway B utilize separate components and separate connections therebetween. In an embodiment, the primary pathway A and the secondary pathway B are incorporated into a single system using the same segment-terminating nodes 406 and 408 and segment nodes 410 and connections 412, such that each node 406-410 and the connections 412 provide bi-directional transmission of signals.

Figure 5:
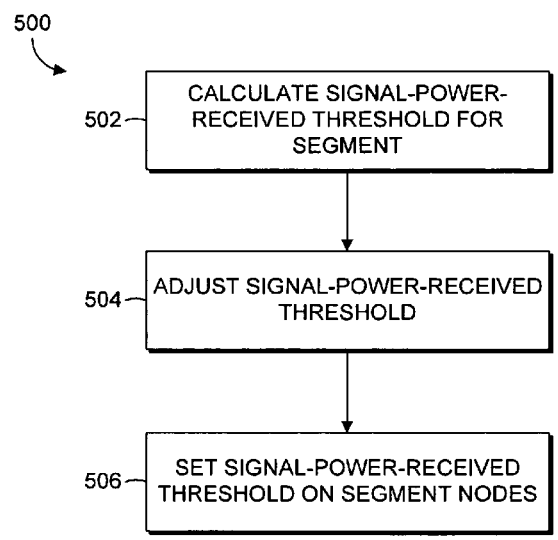
FIG. 5 is a flow diagram depicting a method for setting received signal power threshold values on nodes in a communications network in accordance with an embodiment of the invention.

Referring now to FIG. 5, a method 500 for setting signal-power-received threshold values on nodes in a communications network is described in accordance with the embodiment of the invention. Initially, a signal-power-received threshold for a segment of a communications network is calculated, as indicated at 502. A signal-power-received threshold indicates one of a maximum or a minimum signal power that should be received by a node on a segment of a route.

With additional reference to FIG. 3 and assuming for sake of illustration that signals are transmitted in a single direction, a signal is transmitted from a segment-terminating node 302, such as a multiplexer. The signal is transmitted at a power level that is predetermined based on design specifications. As the signal is transmitted along the path of the segment 300 from the segment-terminating node 302 to segment-terminating node 304 it crosses five spans. A span is indicated by the span 310 between consecutive nodes 302, 306, 304 along the segment 300.

Segment 300 is designed such that at least a predetermined amount of power is lost for every span that a signal crosses. As such, the power transmitted by the segment terminating node 302 is greater than the signal power received at the other end of the span at the segment node 306. The signal is amplified within the segment node 306, and the power transmitted from the segment node 306 is higher than the power received by a segment node 307. The signal is amplified again in the segment node 307, and the transmit power of the segment node 307 is higher than the power level received by the segment-terminating node 304. The signal-power-receive threshold indicates a minimum or maximum expected power level at each receiving node along the signal's path between the segment terminating node 302, the segment nodes 306 and 307, and the segment-terminating node 304.

The signal-power-received threshold is calculated based on design specifications for the components of the segment, such as the segment 300. The design specifications are stored in a design specifications database, such as the design-specification database 108. As described previously, the design specifications include one or more tables, charts, graphs, or lists of settings, or other data elements, such as that depicted in Tables 1 and 2 below. As such, having known values for the number of channels 308 being processed and transmitted by a segment-terminating node 302 and a number of spans included in the segment 300, a transmit power level is determined from the design specifications. For example, with reference to Table 1, the segment 300 having five spans and carrying nine channels requires a transmit power level of 13 dB.

TABLE 1

Transmit Power Levels

| Transmit Power Level (dB) | 1-4 Spans (Short) | 5-7 Spans (Medium) | 8-10 Spans (Long) |
|---|---|---|---|
| 8 | 1-3 Channels | 1-2 Channels | 1 Channel |
| 9 | 4-6 Channels | 3 Channels | 1 Channel |
| 10 | 7-8 Channels | 4 Channels | 2 Channels |
| 11 | 9-11 Channels | 5 Channels | 3-4 Channels |
| 12 | 12-15 Channels | 6 Channels | 5-6 Channels |
| 13 | 16-19 Channels | 7-9 Channels | 7-8 Channels |
| 14 | 20-24 Channels | 10-13 Channels | 9-10 Channels |
| 15 | 25-29 Channels | 14-17 Channels | 11-13 Channels |
| 16 | 30-34 Channels | 18-22 Channels | 14-17 Channels |
| 17 | 35-40 Channels | 23-27 Channels | 18-22 Channels |
| 18 | 41-50 Channels | 28-32 Channels | 23-26 Channels |
| 19 | 51-63 Channels | 33-38 Channels | 27-33 Channels |
| 20 | 64-80 Channels | 39-80 Channels | 34-80 Channels |

Table 2, below, includes a sample span-loss table.

TABLE 2

| Number of Spans | Span Loss | |
|---|---|---|
| | Maximum Power Loss (dB) | Minimum Power Loss (dB) |
| 1 | 34.7 | 22.0 |
| 2 | 31.5 | 22.0 |
| 3 | 29.6 | 22.0 |
| 4 | 28.3 | 22.0 |
| 5 | 27.3 | 22.0 |
| 6 | 26.5 | 22.0 |
| 7 | 25.7 | 22.0 |
| 8 | 24.9 | 22.0 |
| 9 | 24.1 | 22.0 |
| 10 | 23.2 | 22.0 |

Further, the maximum and minimum allowable signal power loss over the segment is also determined. For example, with reference to Table 2, the segment 300 having five spans has a design specified power loss of 27.3 dB and a minimum power loss of 22.0 dB. It is noted that Table 2 indicates a minimum power loss of 22.0 dB for any segment, because Table 2 is based on a communications network having attenuators or other components to ensure at least a minimum of 22.0 dB of power loss over a segment.

The maximum and minimum power loss over the segment is described as allowable based on the design specification limits. In use, the signal power loss might be greater or less than the design specified maximum and minimum power loss while the segment 300 still functions properly. However, operating within design specifications is desirable and advantageous to operation of the system. Basing maximum and minimum received thresholds on the design specifications provides a reliable and relevant threshold on which to base alarm settings for the segment.

Having determined the transmit power level and the maximum and minimum power loss over the segment the signal-power-received threshold for the segment is calculated. The signal-power-received maximum threshold is equal to the transmit power level minus the minimum power loss. (Signal-power-received Maximum Threshold=Transmit Power Level−Minimum Power Loss.) The minimum signal-power-received threshold is equal to the transmit power level minus the maximum signal power loss. (Signal-power-received Minimum Threshold=Transmit Power Level−Maximum Power Loss.) Thus, the Signal-power-received Maximum Threshold for the segment 300 is −9 and the Minimum Threshold is −14.3. These calculations are sufficient for calculating signal-power-received thresholds for a given communications network and components therein. However, for other communications-networks providers and components, various other design specifications and calculations may be utilized to calculate minimum and maximum signal-power-received thresholds for a given segment.

At 504, the signal-power-received threshold calculated for the segment is adjusted. Such adjustment is completed by providing an additional calculation to the computed signal-power-received threshold in order to expand or contract the range between the maximum and minimum signal-power-received thresholds. Such additional calculations include for example and not limitation, adding or subtracting a given amount to the maximum or minimum signal-power-received thresholds or multiplying or dividing the calculated signal-power-received thresholds by a factor. Adjusting the signal-power-received thresholds may be advantageous where a given segment is shown to operate better or worse than provided by the design specifications. As such alarm conditions may be adjusted to more accurately describe conditions of the segment. For example, a value of 2 dB is added to the maximum signal-power-received threshold and subtracted from the minimum signal-power-received thresholds calculated above for span 310 to broaden a range of allowable received signal-power values, because the span 310 has been shown to perform better than expected based on the design specifications. Thus, the Adjusted Signal-power-received Maximum Threshold for the span 310 is −7 and the Minimum Threshold is −16.3. As such, alarms for the span 310 are based on a wider range of minimum and maximum signal-power-received thresholds and, thus, a number of unnecessary or unwanted alarm conditions are avoided.

The calculated signal-power-received threshold is set on the one or more segment nodes and segment-terminating nodes such as segment-terminating nodes 302 and 304 and segment nodes 306 of segment 300 as depicted in FIG. 3 and as indicated at 506. The signal-power-received thresholds are communicated to the one or more segment nodes via any available communications mechanism such as, for example, a network, portable memory devices, or through manual input. In an embodiment the signal-power-received threshold is communicated through a segment node via a network over a Telenet connection and a TL-1 command. The communication of the signal-power-received threshold to the segment nodes may be communicated to a single segment node and then communicated to the remaining segment nodes by the first segment node, communicated through the first segment node to the various remaining segment nodes on the segment, or communicated to each individual segment node individually. As the signal-power-received threshold is calculated for the segment the same values are communicated to each of the segment nodes on the segment. In an embodiment, a different signal-power-received threshold is communicated to one or more of the segment nodes.

Figure 6:
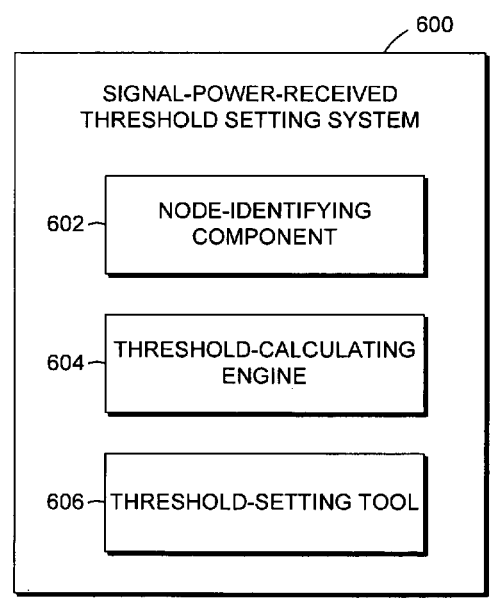
FIG. 6 is a block diagram depicting a system for setting signal-power-received thresholds in a communications network in accordance with an embodiment of the invention.

With reference now to FIG. 6, a block diagram depicting a system 600 for setting signal-power-received thresholds for a communication network is described in accordance with an embodiment of the invention. The system 600 includes a node-identifying component 602, a threshold-calculating engine 604, and a threshold-setting tool 606. The node-identifying component 602 identifies two or more nodes on a route in a communications network that make up a segment. The identification of the two or more nodes on the route making up the segment may include identifying a name or identification number such as a terminal identification number, a system identification number, or an Internet protocol (IP) address.

By identifying the nodes on a segment, the node-identifying component also determines a number of spans between the nodes on the segment as well as the number of channels being transmitted over the segment. To determine the identity of the nodes on the segment the node-identifying component accesses a route-information database, such as route-information database 106 as described in FIG. 1. Upon determining the identity of the nodes on a segment, the node-identifying component 602 communicates with the individual nodes on the segment to determine the number of channels and spans. In another embodiment, the node-identifying component 602 retrieves the information on the number of spans and channels from a route-information database.

The threshold-calculating engine 604 employs the number of channels and the number of spans of the segment and one or more design specifications stored and retrieved from a design-specification database, such as the design-specification database 108, in order to calculate a signal-power-received threshold for the segment. The signal-power-received threshold is calculated as described above with respect to FIG. 5 using design specifications such as that provided in Tables 1 and 2. As such, one or both of a minimum and a maximum signal-power-received threshold is calculated. The threshold-calculating engine 604 may also provide one or more operations on the calculated signal-power-received threshold in order to adjust the range between the minimum and maximum signal-power-received threshold. As described previously, such may be desirable where a given segment performs better or worse than expected based on design specifications.

The threshold-setting tool 606 communicates the signal-power-received threshold to one or more of the nodes of the segment. As described previously, the communication of the signal-power-received thresholds to the nodes on the segment is provided via a network and is communicated to each node on the segment.

Figure 7:
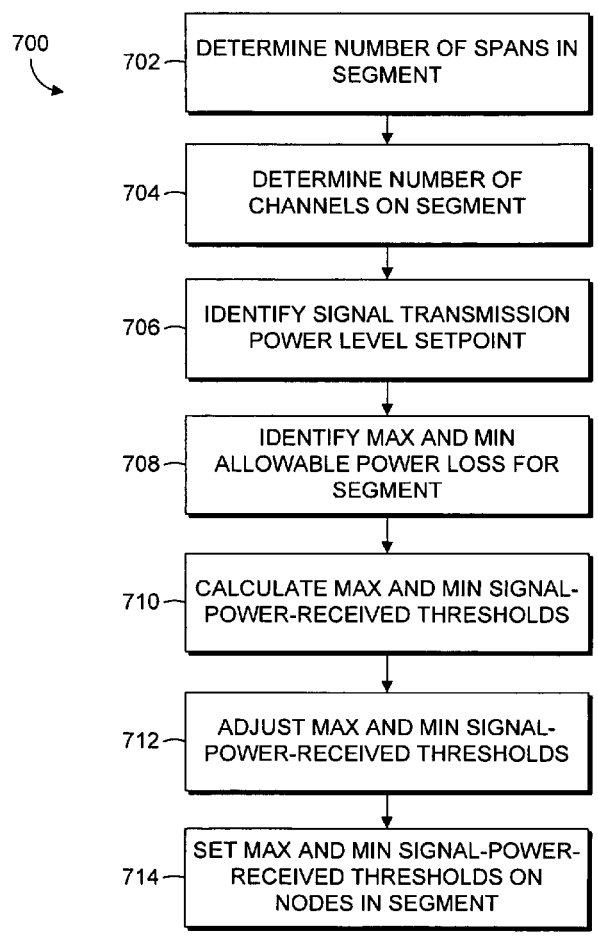
FIG. 7 is a flow diagram depicting a method for setting signal-power-received threshold values in a fiber-optic communications network in accordance with an embodiment of the invention.

Referring now to FIG. 7 and with continued reference to FIG. 3, a method 700 for setting signal-power-received thresholds values in a fiber-optic communications network is described in accordance with an embodiment of the invention. As indicated at 702, a number of spans in a given segment is determined. A number of channels transmitted over the segment is also determined, at 704. Each of the determinations of steps 702 and 704 are made by communicating with a route-information database, such as the route information-database 106 depicted in FIG. 1, or are identified by communicating with one or more of the nodes on the segment.

A signal transmission power level setpoint is determined, as indicated at 706. The signal transmission power level setpoint is identified, for example, by using one or more design specifications stored in a design-specifications database. Such design specifications include one or more tables, charts, graphs, or lists of design specifications as described previously and as provided in Tables 1 and 2 above. For example, employing Table 2 and having determined the number of spans in the segment and the number of channels being transmitted over the segment, the transmit power level is determinable.

Further, knowing the number of spans of the segment, Table 2 is used to determine the maximum and minimum signal power loss based on the design specifications, as indicated at 708. At 710, the maximum and minimum signal-power-received thresholds are calculated by subtracting the identified maximum power loss from the identified transmit power level or by subtracting the identified minimum power loss from the identified transmit power level, respectively. The calculated minimum and maximum signal-power-received thresholds are then adjusted to compensate for historical performance for the segment by providing an operation on the maximum and/or minimum received thresholds, as indicated at 712.

The maximum and minimum signal-power-received thresholds are then set at each of the nodes of the segment as indicated at 714. To set the maximum and minimum signal-power-received threshold on each of the nodes of the segment the values are communicated to each node of the segment via a network and Telenet connection using a TL-1 command.

Figure 8:
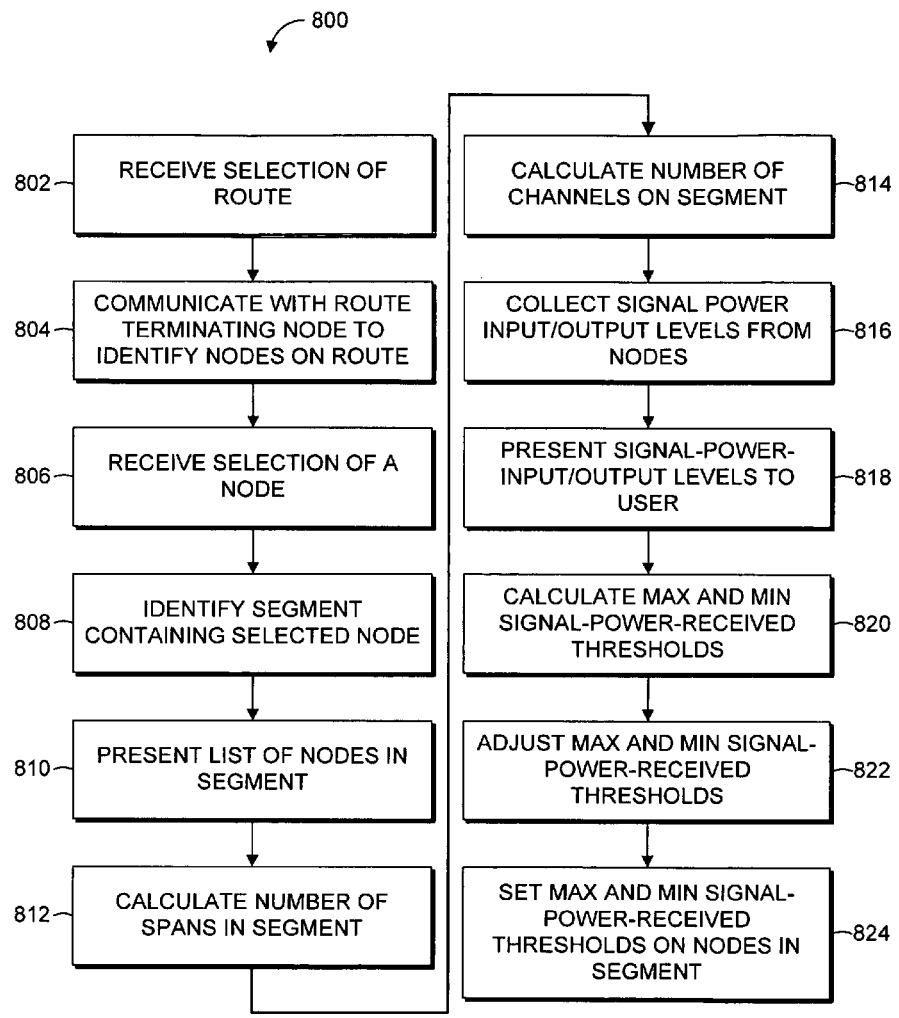
FIG. 8 is a flow diagram depicting a method for setting signal-power-received threshold values in a fiber-optic communications network in accordance with an embodiment of the invention.

With reference now to FIG. 8, a flow diagram depicting a method 800 for setting signal-power-received threshold values on a fiber-optic communications network is described in accordance with an embodiment of an invention. At 802, a selection of a communication route in a fiber-optic communications network is received from a user at a computing device. The user is provided with a user interface displaying a listing and/or a graphical image of the routes of a communication network from which to select the communications route, among various other methods known in the art.

Upon selecting a communications route from the fiber-optic communications network, an IP address or other communication address for each of the terminating nodes of the route are identified. The computing device initiates a communication connection with one or more of the terminating nodes of the route in order to identify one or more nodes along the route, as indicated at 804. The nodes identified along the route include the terminating nodes of the route as well as the terminating nodes of the segments of the route, and nodes within each segment of each route. In an embodiment, only a portion of the nodes along a route are identified.

A listing or other graphical presentation of the nodes is presented to a user and a selection of a node is received from the user, as indicating at 806. The selection of a node along the route by the user indicates a specific segment of the route for which signal-power-received thresholds are to be calculated. The specific segment of the route containing the selected node is identified, as indicated at 808. A listing or each of the nodes on the selected segment is determined and presented along with an identifier for each of the nodes and a node type such as, for example and not limitation, a multiplexer, an amplifier, a WADM, or a de-multiplexer, as indicated at 810. In an embodiment, the listing of each of the nodes on the selected segment is presented to a user at a user interface of a computing device. The listing may depict an order or sequence of the nodes along a route from a first end to a second end, such as for example from east to west or north to south based on the physical, geographic locations of the nodes.

Having identified a selected segment and the nodes therein, the number of spans between the nodes is calculated, as indicated at 812, and a number of channels transmitted over the segment is calculated, as indicated at 814. In an embodiment, additional information such as current signal power input and output level from the segment and/or one or more of the nodes on the segment are collected, as indicated at 816. Such collected data may be used for additional calculations and/or manipulated and presented to a user, as indicated at 818. A user may desire such information to aid in analysis of the segment performance and/or one or more nodes on the segment.

The computing device calculates the signal-power-received minimum and maximum thresholds for the segment based on the calculated number of spans and channels of the segment. Where the segment provides transmissions in both a first and a second direction, signal-power-received thresholds are calculated for each direction of signal transmission, as indicated at 820. At 822 the signal-power-received thresholds are adjusted based on historical performance of the segment and/or expected future performance of the segment, as indicated at 822. The calculated signal-power-received thresholds are communicated to and set at each of the segment nodes of the segment, as indicated at 824.

Where the segment provides transmission in both a first and second direction, the signal-power-received thresholds are set at each node for each direction. In an embodiment, both the first and second directions of transmissions are provided by the same components or nodes and the signal-power-received thresholds for each direction of transmission are set on each of the individual segment nodes. In another embodiment, separate components are employed for each direction of transmission of the signals on the segment and thus, the signal-power-received thresholds are set on the respective components. In yet another embodiment, and as depicted in FIG. 4, both a primary pathway and a secondary pathway are provided for a given segment. As such, signalpower-received thresholds are calculated for both the primary and for the secondary pathway and for each direction of transmission. The signal-power-received threshold values are then communicated to the nodes of their respective pathway and transmission direction and set thereon.

In another embodiment of the invention, signal-power-received thresholds are automatically calculated for each segment of each route in a communications network on a periodic basis by a computing device. As such, no user interaction is required to identify a given route or segment. Further, as changes are made to the communications-network route, segments, or components or nodes therein, the signal-power-received thresholds are automatically recalculated and updated based on the changes in the network. Thus, no user interaction is required and the signal-power-received thresholds remain up-to-date, relevant, and useful data points.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after, and because of, reading the disclosure. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, perform a method in a communications network for setting signal-power-received threshold values on one or more nodes in the communications network, the method comprising:
via a computing device, calculating a transmit-power level for a segment of the communications network based on design specifications for the communications network;
determining a maximum and a minimum signal-power-received threshold for the segment using the transmit-power level;
specifying an alarm condition for performance of the segment based on the maximum and minimum signal-power-received thresholds for the segment; adjusting a sensitivity of the alarm condition based on the performance of the segment by expanding a range of the maximum and minimum signal-power-received thresholds when actual performance of the communications network is better than expected based on the design specifications or decreasing a range of the signal-power-received thresholds when actual performance of the communications network is poorer than expected based on the design specifications;
via the computing device, setting the signal-power-received thresholds for the segment on one or more nodes in the segment;
detecting a change to one of the plurality of nodes in the segment, now an altered segment;
automatically calculating new signal-power-received thresholds for the altered segment; and
setting the new signal-power-received thresholds on the altered segment.

2. The media of claim 1, further comprising;
receiving a selection of a communications route in a communications network;
communicating with a route-terminating node to identify one or more nodes on the route, wherein the route-terminating node is a node at an endpoint of the route;
receiving a selection of one of the one or more nodes on the route;
identifying the segment of the route that contains the node, wherein the segment is a portion of the route that includes two nodes that are segment-terminating nodes and all nodes therebetween, and wherein the segment-terminating node is a node at an endpoint of the segment; and
presenting a list of one or more nodes included in the segment.

3. The media of claim 2, further comprising;
via the computing device, calculating a number of spans between the one or more nodes included in the segment, wherein the span is a direct connection between two of the nodes; and
via the computing device, calculating a number of channels transmitted over the segment.

4. The media of claim 3, wherein calculating the transmit-power level is also based on the number of spans and the number of channels.

5. The media of claim 2, further comprising;
collecting one or more current signal power input and output levels from the one or more nodes on the segment; and
presenting the one or more current signal power input and output levels from the one or more nodes on the segment to a user.

6. The media of claim 1, wherein the communications network is a fiber-optics communications network and the signal-power-received threshold is a light-power-received threshold.

7. The media of claim 1, wherein the segment includes communications in two directions and a signal-power-received threshold is calculated for each direction.

8. The media of claim 1, wherein the segment includes a primary and a secondary set of two or more nodes connected in series, and wherein the signal-power-received threshold is calculated, adjusted, and set for each of the primary and secondary sets of two or more nodes connected in series.

9. The media of claim 1, wherein the signal-power-received threshold is automatically updated on a periodic basis.

10. The media of claim 1, wherein setting the signal-power-received threshold for the segment on one or more nodes in the segment comprises communicating the signal-power-received threshold to each of the one or more nodes in the segment via a telecommunications network (Telnet) connection.

11. A system in a communications network for setting signal-power-received thresholds, the system comprising:
a node-identifying component that identifies two or more nodes on a route in the communications network that comprise a segment of the route, and identifies a number of spans between the two or more nodes and a number of channels transmitted over the segment, wherein the segment includes two terminating nodes that comprise endpoints of the segment and all nodes therebetween, and wherein the span is a connection between two consecutive nodes of the segment;
the node-identifying component that detects a change to the one or more nodes in the segment, now an altered segment;
a threshold-calculating engine that calculates a signal-power-received threshold range for the segment based on the number of spans, the number of channels, and one or more design specifications for the segment, the signal-power-received range including a maximum signal-power-received threshold and a minimum signal-power-received threshold;

the threshold-calculating engine that automatically calculates new signal-power-received thresholds for the altered segment;

a threshold-setting tool that sets the signal-power-received threshold range on the one or more nodes in the segment and that automatically periodically updates the signal-power-received threshold range based on performance of the segment, the threshold-setting tool communicating the signal-power-received range to a first node on the segment via a telecommunications network, and the first node communicating the signal-power-received range to one or more remaining nodes on the segment; and the threshold-setting tool that sets the new signal-power-received thresholds on the altered segment.

12. The system of claim 11, wherein the threshold-calculating engine modifies the maximum and the minimum signal-power-received thresholds by increasing the maximum signal-power-received threshold and decreasing the minimum signal-power-received threshold when an actual performance of the communications network is better than expected based on the design specifications, or decreasing the maximum signal-power-received threshold and increasing the minimum signal-power-received threshold when the actual performance of the communications network is poorer than expected based on the design specifications.

13. The system of claim 11, wherein the design specifications include one or more tables that specify signal power transmit levels based on a number of spans and a number of channels, a minimum power loss for a given number of spans, and a maximum power loss for the given number of spans.

14. The system of claim 13, wherein the threshold-calculating engine determines a specified signal power transmit level, a minimum power loss and a maximum power loss for a given segment, and wherein the threshold-calculation engine subtracts the minimum power loss from the specified signal power transmit level to calculate a maximum signal-power-received threshold, and subtracts the maximum power loss from the specified signal power transmit level to calculate a minimum signal-power-received threshold.

15. Non-transitory computer-readable media having computer-executable instructions embodied thereon that, when executed, perform a method for setting signal-power-received threshold values in a fiber-optic communications network, the method comprising:

determining a number of spans between terminating nodes of a segment of the fiber-optic communications network, wherein a terminating node is a node at an endpoint of the segment and the span is a connection between two consecutive nodes of the segment;

determining a number of channels being transmitted over the segment; based on the number of spans, the number of channels, and one or more design specifications of the fiber-optic communications network, identifying a signal transmission power level setpoint; based on the number of spans and the one or more design specifications of the fiber-optic communications network, identifying a maximum and a minimum allowable signal power loss for the segment;

via a computing device, calculating a maximum and a minimum signal-power-received threshold for the segment, the maximum and minimum signal-power-received thresholds defining an operating range, operation of the segment outside of which results in an alarm;

adjusting the sensitivity of the alarm by adjusting the maximum and minimum signal-power-received thresholds for the segment based on historical performance of the segment;

via the computing device, setting the maximum and minimum signal-power-received thresholds for the segment on a plurality of nodes in the segment using a telecommunications network connection to each of the plurality of nodes in the segment;

detecting a change to one of the plurality of nodes in the segment, now an altered segment;

automatically calculating new signal-power-received thresholds for the altered segment; and setting the new signal-power-received thresholds on the altered segment.

16. The media of claim 15, wherein adjusting the maximum and minimum signal-power-received thresholds for the segment comprises increasing the maximum signal-power-received threshold and decreasing the minimum signal-power-received threshold when an actual performance of the communications network is better than expected based on the design specifications, or decreasing the maximum signal-power-received threshold and increasing the minimum signal-power-received threshold when the actual performance of the communications network is poorer than expected based on the design specifications.

17. The media of claim 15, wherein calculating a maximum and a minimum signal-power-received threshold for the segment comprises subtracting the minimum allowable signal power loss for the segment from the transmission power level setpoint to calculate the maximum signal-power-received threshold, and subtracting the maximum allowable signal power loss for the segment from the transmission power level setpoint to calculate the minimum signal-power-received threshold.

* * * * *